United States Patent
Rühl

(10) Patent No.: US 6,580,375 B2
(45) Date of Patent: Jun. 17, 2003

(54) DATA PROCESSING SYSTEM FOR A VEHICLE INFORMATION SYSTEM AND METHOD

(75) Inventor: Hans-Wilhelm Rühl, Solms (DE)

(73) Assignee: Mannesmann VDO AG, Frankfurt am Main (DE)

( * ) Notice: Subject to any disclaimer, the term of this patent is extended or adjusted under 35 U.S.C. 154(b) by 55 days.

(21) Appl. No.: 09/847,927

(22) Filed: May 3, 2001

(65) Prior Publication Data

US 2002/0004702 A1 Jan. 10, 2002

(30) Foreign Application Priority Data

Apr. 28, 2000 (EP) .......................................... 00 201 528

(51) Int. Cl.[7] .............................................. G08G 1/123
(52) U.S. Cl. ........................ 340/988; 340/995; 340/438
(58) Field of Search ................................. 340/988, 995, 340/438; 701/200–226

(56) References Cited

U.S. PATENT DOCUMENTS

| | | | | |
|---|---|---|---|---|
| 5,535,125 A | * | 7/1996 | Okabe | 701/211 |
| 5,848,373 A | | 12/1998 | DeLorme et al. | 701/200 |
| 5,889,493 A | * | 3/1999 | Endo | 342/357 |
| 5,938,721 A | | 8/1999 | Dussell et al. | 701/211 |
| 6,177,905 B1 | * | 1/2001 | Welch | 342/357.13 |
| 6,182,006 B1 | * | 1/2001 | Meek | 701/200 |
| 6,182,010 B1 | * | 1/2001 | Berstis | 701/211 |
| 6,249,744 B1 | * | 6/2001 | Morita | 701/213 |
| 6,396,454 B1 | * | 5/2002 | Davis et al. | 343/788 |
| 6,427,115 B1 | * | 7/2002 | Sekiyama | 701/208 |

FOREIGN PATENT DOCUMENTS

FR  2 726 382  10/1994  ......... G06F/15/163

* cited by examiner

Primary Examiner—Toan Pham
(74) Attorney, Agent, or Firm—Cohen, Pontani, Lieberman & Pavane

(57) ABSTRACT

A vehicle navigation system includes various interlinked facilities including a user input/output facility and a position determining facility. The navigation system is arranged to physically interface with a data communication facility pertaining to a personal digital assistant that includes a coordinate driven display, a geometrically or coordinate-wise organized input mechanism, and input keys.

10 Claims, 2 Drawing Sheets

DATA PROCESSING SYSTEM FOR A VEHICLE INFORMATION SYSTEM AND METHOD

BACKGROUND OF THE INVENTION

1. Field of the Invention

The invention relates to a data processing system for operating a vehicle information system.

2. Description of the Related Art

Vehicle information systems such as, for example, vehicle navigation systems are known. The object of such navigation systems is generally to facilitate the planning of various levels of a user's itinerary. For example, a navigation system may geographically select an optimum route through the setting of temporal specifications with respect to various destination locations or categorized activities. The navigation system may also heuristically solve the "Travelling Salesman" problem. Apart from navigational assistance, vehicle information systems may provide and process actual location, technical parameters, repair guidance, and various other categories of information relevant for vehicle use.

SUMMARY OF THE INVENTION

The present invention relates to the recognition that user interface facilities provided on such vehicle information systems are often less than optimum compared to user interface technology presently available and that the vehicle information systems could in consequence benefit from replacing various elements thereof by facilities that are offered in other devices such as a Personal Digital Assistant (PDA).

Present-day navigation systems generally have their own display facility and their own control. The control may be either a fixed facility or a remote control device. In either case, the input/output facilities thereof are rather limited. On the other hand, present day PDA devices include either a large fully alphanumerical keyboard and a small display or a small keyboard that is much less than fully alphanumerical and a relatively large display that is operated through a geometrically or coordinate-wise organized input mechanism such as, for example, a touch screen or a stylus or another similar activating member. The present invention recognizes that the latter type of PDA in particular may be used to replace and amplify the remote control facilities of known vehicle information systems such as navigation systems.

The PDA device by itself has been commercialized to an extensive degree. However, the present invention proposes using the PDA device as an advanced peripheral device for a vehicle information system. The use of the PDA as a peripheral device make the remote control and display properties of the vehicle information system virtually superfluous. Further, the use of the PDA adds to the level of organizational improvements in that the PDA may be used for data exchange between an office or desktop computer and the vehicle navigation/information system. The PDA may optionally be used for theft control purposes with respect to the vehicle, or for data gathering or command processing for vehicle-based applications, such as fleet management.

The PDA may use an infrared link such as an Infra Red Data Association (IRDA) standard link or other links such as an RS232 standard link for data communication. The bit-rate necessary therefor may be further limited by transmitting data at a higher signal hierarchy such as, for example, on a character level, an icon level, or a vector level. Particular PDA functions which may be utilized in the present invention are as follows.

Loading of routes which have already been planned from the PDA into the Navigation System;

Loading personal and other names from the PDA into the Navigation System so that the Navigation System can complete the necessary data for planning the route while combining and arranging the various destinations according to geographical proximity and other criteria;

Reporting actual arrival times, travel times, and other data to the PDA for updating its internal PDA data, such as those relating to future appointments Warning a user about a next journey to start, in accordance with appointments that have been made on the level of the PDA;

Implementing a theft control facility through the use of user-individual codes and the interaction thereof with the navigation and information policies of the system; and Fleet control, that is the management of vehicle movement as forming part of a many-vehicle set, with respect to distribution logistics and other purposes.

Physically combining a vehicle/information system with a PDA will provide for a more efficient intercoupling between the various components of the hybridized organization and therefore raise productivity, as well as allow new and improved results over those of the prior art.

In consequence, amongst other things, it is an object of the present invention to physically integrate the functionality of a vehicle information system and various functionalities pertaining to the field of office automation and particularly the functional features of a PDA.

The object of the present invention is met by a data processing system, including a vehicle information system having a plurality of functional units including a user input/output unit and a position determining unit. The data processing system further includes a personal digital assistant device including an input/output device having a coordinate driven display, a geometrically coordinate-wise organized input unit, and input keys. A remote interconnection connects the vehicle information system with the personal digital assistant device such that the personal digital assistant is arranged for communicating with the vehicle information system.

The object of the present invention is also met by a method for operating a vehicle information system having a plurality of interlinked units, the plural interlinked units including a user input/output unit and a position determining unit. The method includes the step of interfacing the vehicle information system with a personal digital assistant having an input/output device including a coordinate driven display, a geometrically coordinate-wise organized input mechanism, and input keys, wherein said step of interfacing includes interconnecting the vehicle information system with the personal digital assistant via a remote interconnection.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like references characters denote similar elements throughout the several views.

DETAILED DESCRIPTION OF THE PRESENTLY PREFERRED EMBODIMENTS

The present invention combines the functionalities of a vehicle information system and a PDA. An interface may be arranged between the PDA and the vehicle information system via which the PDA communicates with the vehicle information system. For example, data may be loaded from the PDA into the navigation system via the interface and may be received at the PDA from the vehicle navigation system via the interface.

Figure 1:
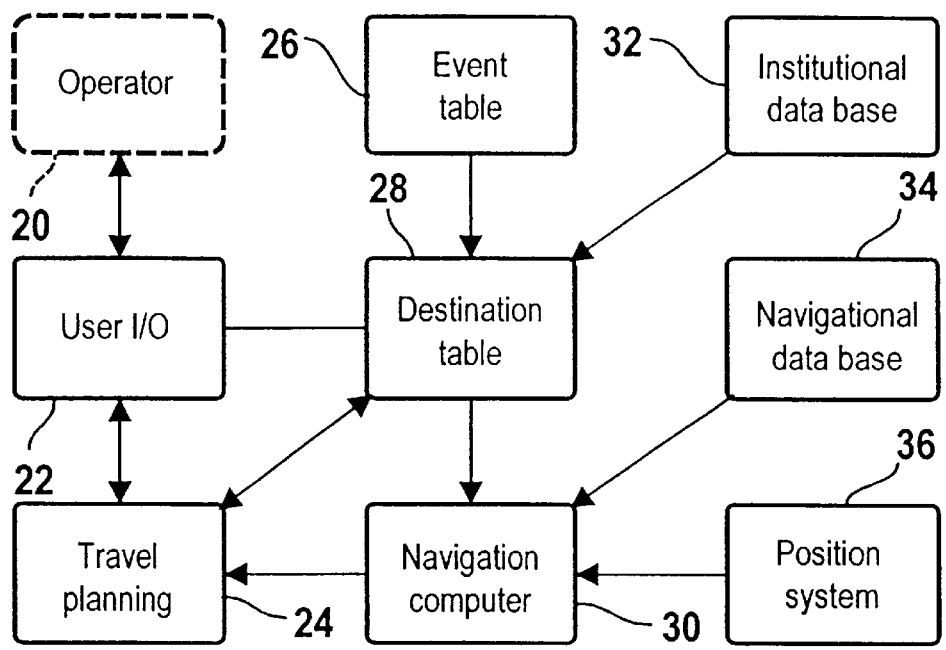
FIG. 1 is a block diagram of a prior art vehicle navigation system.

FIG. 1 is a block diagram of a prior art vehicle navigation system including various subsystems. A user 20 who requires guidance from the vehicle navigation system interfaces with the system via an input/output unit 22 which may include various hardware and software facilities such as a keyboard, a mouse, speech, and other audio functions, and a display. An institutional database 32 may store various entries representing, for example, hotels, restaurants or other facilities, together with associated data such as location, business hours, and actual services present at those facilities. A navigational database 34 includes data related to a road network together with physical distances or travel time distances between representative points, road classifications, and other data related thereto. A vehicle position system 36 detects an actual position of the vehicle and may, for example, include a GPS System. The system may further include an event table 26 which includes a listing of roadblocks and traffic jam situations that have been communicated by a higher level authority such as a Radio Data System (RDS). The events of the event table 26 are those events which may prevent the reaching of certain destinations, cause delays in reaching a destination, or necessitate the vehicle to take a detour.

A destination table 28 contains the destinations and associated timing indications such as entered by the user through the input/output unit 22 and subject to information from a travel planning unit 24, the institutional database 32, and the event table 26. The information from the destination table 28, the navigational database 34 and the vehicle position data from the vehicle position system 36 is fed to a navigational computer 30. From this information, the navigational computer 30 determines a route to be taken, which route may contain various interval points and furthermore, timing indications associated with the various interval points. The travel planning unit 24 receives information from the navigational computer 30 and bidirectionally interfaces to the destination table 28 and the user input/output unit 22. The travel planning unit 24 will update the destination table 28 if it fails to find a correct solution for attaining all interval points. Furthermore, the travel planning unit 24 will signal the user what route is to be taken and will signal the above failure to allow the user to modify the set of interval points and/or associated timing indications. The system depicted in FIG. 1 is a comprehensive example of what the navigation system may comprise. However, a person skilled in the art will recognize that often not all diagram blocks will be necessary in the embodiment of the present invention. Alternatively, other functional blocks may be added to provide ancillary functions or to divide the functions of the blocks shown in FIG. 1.

Figure 2:
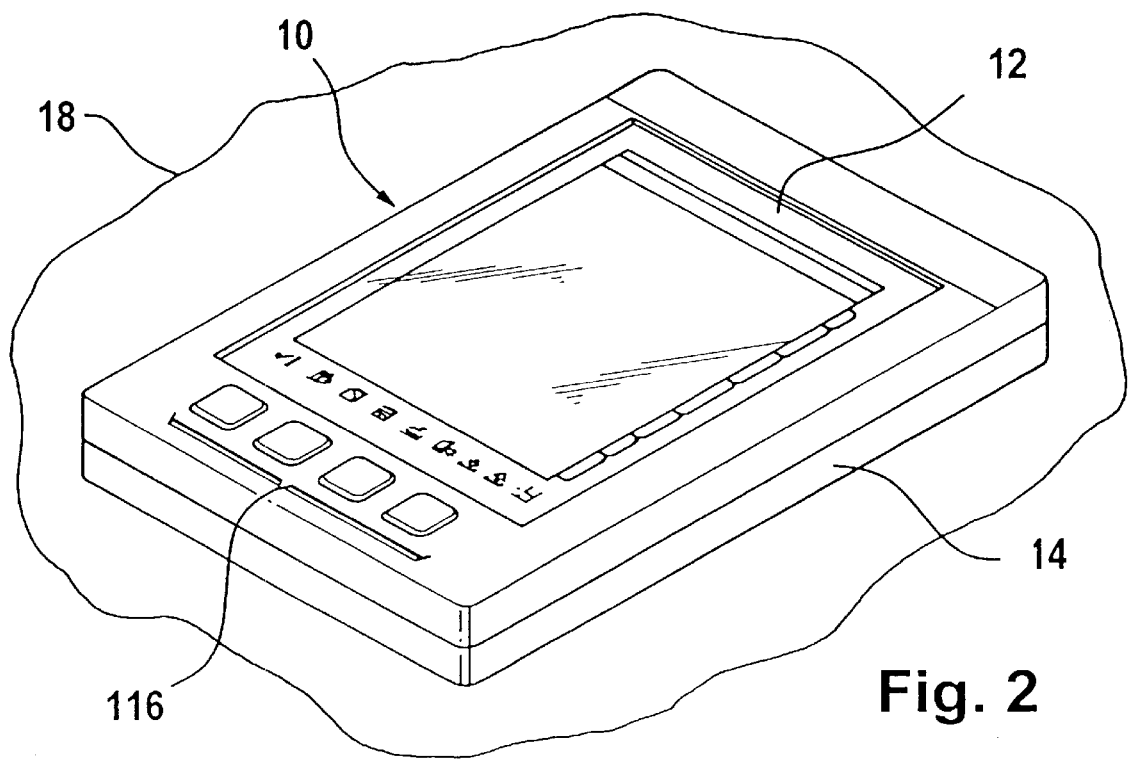
FIG. 2 is a perspective view of a PDA operated through a geometrically organized input mechanism.

FIG. 2 is a perspective view of a PDA 10 operated through a geometrically or coordinate-wise organized input mechanism. The PDA 10 includes a display screen 12 supported in a housing 14 for displaying various items provided from a memory and not shown here. Various input keys 16 are included on the housing of the PDA 10 for commanding the mode of operation of the PDA 10. The input keys 16 may control the showing of a document or map, a set of command icons, or various other items that by way of principle would be known from the art of PDA devices. The input keys 16 may allow the user to scroll a document of which the actually displayed field may be just a cut-out. Furthermore, the PDA may additionally include a mouse, a joy-stick, a stylus actuated input, or another geometrically organized input mechanism. The mouse would interact with a work surface 18 to scroll the displayed field on the PDA 10 such as, for example, to select map or menu items, to actuate or move icons displayed and execute various functions of mouse technology. Similar properties apply to a joystick or to a stylus such as for actuating an on-screen control icon.

Figure 3:
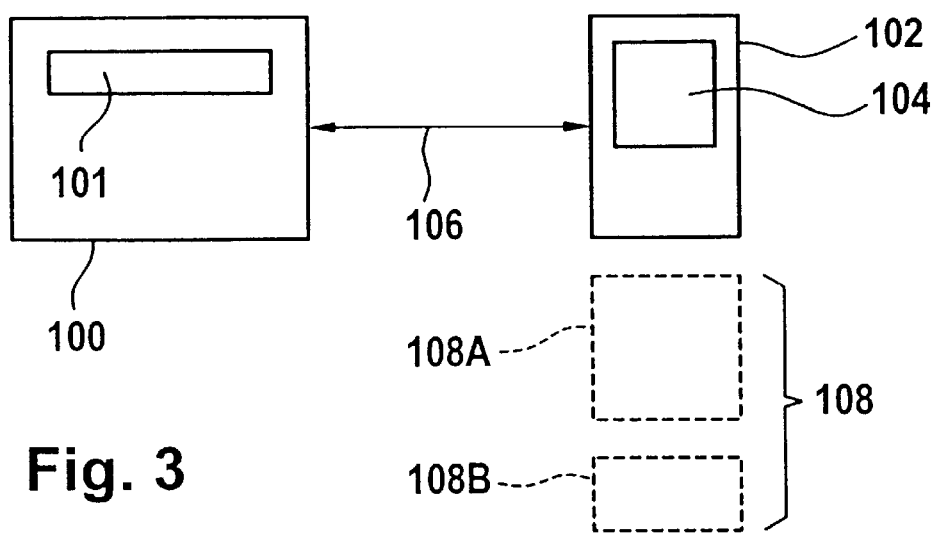
FIG. 3 is a block diagram of a system according to the present invention.

FIG. 3 is a block diagram of the system according to the present invention including a vehicle navigation system 100 with a storage module 101. The vehicle navigation system 100 may, for example, comprise the system shown in FIG. 1 or it may comprise another vehicle navigation system. The storage module 101 may be a CD-ROM or other memory device. The system further includes a PDA 102 such as the PDA of FIG. 2. The PDA 102 includes a display screen 104 which may, for example, have a size comprising 8×10 centimeters. The vehicle navigation system 100 is interconnected with the PDA 102 via an interconnection 106 which may include an RS232 standard connection or any other standard wired or wireless connection. The PDA 102 has various functional levels 108, such as vector graphics to pixel conversion 108A and icon display 108B functionalities. The vehicle information system may provide for positioning, dead reckoning, route calculation, guidance, event generation under control of an input device, and provide as outputs menu screens, icon-based guidance, and maps, that will be communicated to the PDA 102 for display on the screen 104.

The output on interconnection 106 may be on the character level, such as by an ASCII or other character code. Alternatively, the output may also be on an icon level, wherein an icon is represented as an icon code that the vehicle information system recognizes and interprets by table access. In a further embodiment, the output may be on a vector graphics level, wherein a vector or similar image part may be represented by the coordinates of its two endpoints and possibly a directional bit, or in more complicated cases by an approximating set of Bezier code coordinates. Inside the vehicle information system, these inputs will straightforwardly be converted to an internal format for the purposes of reckoning and guidance, or for producing internal screen coordinates in the information system's internal representation.

Figure 4:
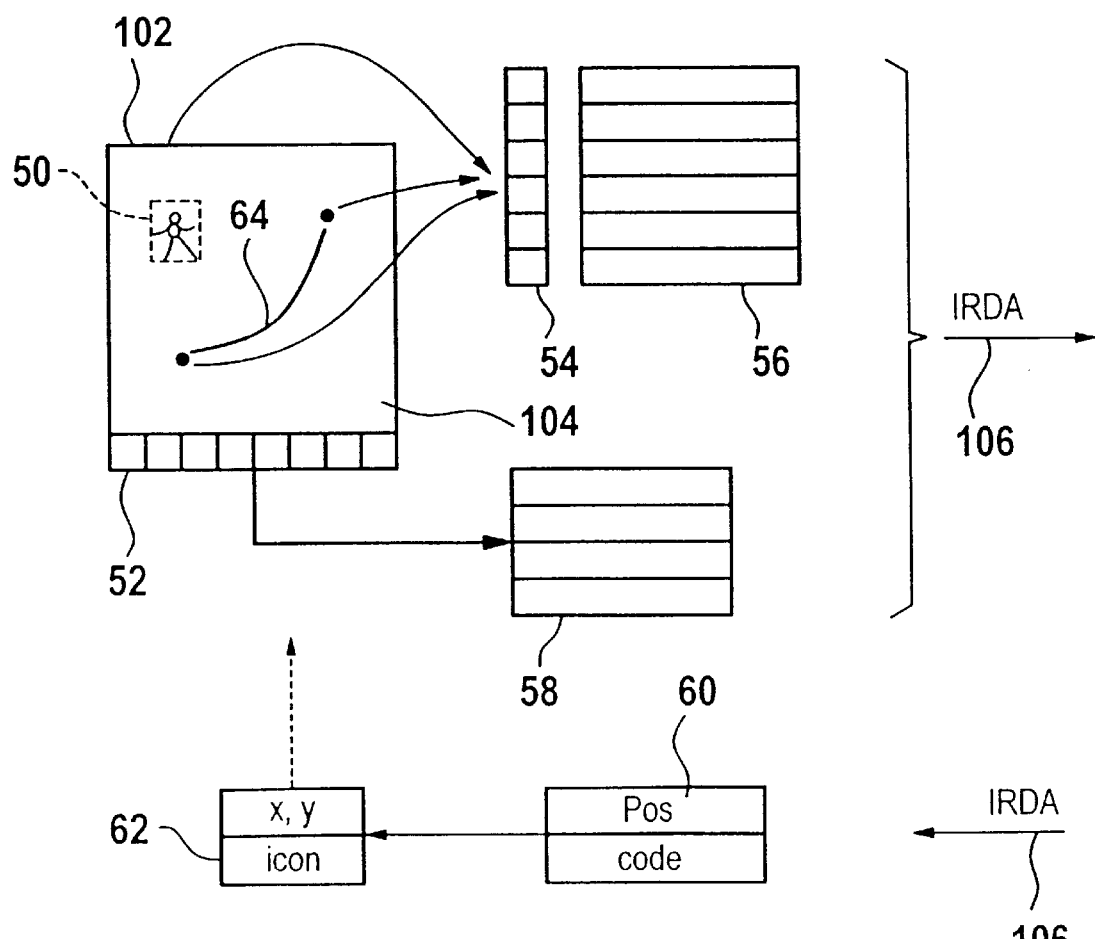
FIG. 4 is a schematic diagram of an information transfer embodiment according to the present invention.

FIG. 4 is a diagram of an information transfer embodiment of the present invention. Like reference characters are used for items corresponding to system of FIG. 3. The display 104 of PDA 102 is shown displaying an icon 50 and a curve 64. An addressing mechanism 54 of code storage 56 address the icon 50 and curve 64 so that these displayed items may have their information transferred in the form of an icon code or the endpoint locations of the curve. If curve 64 is a straight line, the endpoints are sufficient. However, a few more parameters may be necessary, such as the Bezier parameters, for a curve. In addition, drawing categories such as color, dotted, heavy, etcetera may also be transmitted via the addressing mechanism 54 and code storage. Hardware control keys 52 may have their code stored in another code storage 58. The codes from code storages 56, 58 are transferred over an interface 106' to the vehicle information system 100. In this embodiment, the interface 106' is an Infrared Data Association (IRDA) interface. Conversely, the vehicle information system 100 may transfer a combined information item 60 through the interface 106' including a position information and a code to activate storage in code storage 56. Conversion of the information item 60 into an icon shape and/or a curve character is through an encoder 62. In a similar manner the opposite direction of the interface 106' may have a decoder for converting an icon and or curve into an information item. Also, transfer of ASCII or similarly coded characters may lower transfer capability requirements combined with the display of complex character shapes on display 104.

The PDA device 102 may further be arranged for communicating with a computer such as an office or desktop computer. The PDA may also include a theft control function which requires the input of user-individual codes before operation of the PDA. In addition, the communication of PDA with a computer allows a fleet control function to be incorporated in the vehicle information system.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

I claim:
1. A data processing system, comprising:
   a vehicle information system including a plurality of functional units, said functional units including a user input/output unit and a position determining unit;
   a personal digital assistant device including an input/output device having a coordinate driven display, a geometrically coordinate-wise organized input unit, and input keys; and
   a remote interconnection connecting said vehicle information system with said personal digital assistant device such that said personal digital assistant is arranged for communicating with said vehicle information system.

2. The system of claim 1, wherein said personal digital assistant is arranged for communicating with the vehicle information system on at least one of a character level, an icon level, and a vector level.

3. The system of claim 1, wherein said remote interconnection is one of an infrared data association type connection and an RS 232 type connection.

4. The system of claim 1, wherein said personal digital assistant is further arranged for exchanging data with a computer.

5. The system of claim 1, wherein said personal digital assistant is arranged for implementing an anti-theft measure.

6. The system of claim 1, wherein said personal digital assistant is arranged for implementing a higher level information management measure, such as fleet control.

7. A method for operating a vehicle information system having a plurality of interlinked units, the plural interlinked units including a user input/output unit and a position determining unit, said method comprising the step of interfacing the vehicle information system with a personal digital assistant having an input/output device including a coordinate driven display, a geometrically coordinate-wise organized input mechanism, and input keys, wherein said step of interfacing includes interconnecting the vehicle information system with the personal digital assistant via a remote interconnection.

8. The method of claim 7, wherein said step of interconnecting comprises arranging the personal digital assistant to commnunicate with the vehicle information system on at least one of a character level, an icon level, and a vector level.

9. The method of claim 7, wherein said step of interconnecting comprises arranging the remote interconnection according to one of an infrared data association standard and an RS 232 standard.

10. The method of claim 7, further comprising the step of arranging the personal digital assistant for ex changing data with a computer to implement one of an anti-theft function and a higher level information management function.

* * * * *